(12) United States Patent
 Califorrniaa (10) Patent No.: US 9,061,235 B1
(45) Date of Patent: Jun. 23, 2015

(54) METHOD OF COLLECTING WATER ON THE MOON

(76) Inventor: Eurica Califorrniaa, Haleiwa, HI (US)

( * ) Notice: Subject to any disclaimer, the term of this patent is extended or adjusted under 35 U.S.C. 154(b) by 851 days.

(21) Appl. No.: 12/848,219

(22) Filed: Aug. 1, 2010

Related U.S. Application Data

(60) Provisional application No. 61/230,728, filed on Aug. 2, 2009.

(51) Int. Cl.
 *B01D 53/02* (2006.01)
(52) U.S. Cl.
 CPC ............ *B01D 53/02* (2013.01); *B01D 2257/80* (2013.01)
(58) Field of Classification Search
 CPC . B01D 53/02; B01D 2251/60; B01D 2257/80
 USPC ............................................. 95/117; 96/108
 See application file for complete search history.

(56) References Cited

U.S. PATENT DOCUMENTS

| | | | |
|---|---|---|---|
| 4,303,121 A | 12/1981 | Pangborn | |
| 7,922,931 B1 | 4/2011 | Cordaro et al. | |
| 8,172,233 B2 | 5/2012 | Daniels | |
| 8,333,154 B2 | 12/2012 | Fukuyama et al. | |
| 8,361,205 B2 | 1/2013 | Desai et al. | |

OTHER PUBLICATIONS

Wikipedia article on photodissociation, accessed May 7, 2013.*
Wikipedia article on "Atmosphere of the Moon", accessed May 7, 2013.*
Wikipedia article on "Outer space", accessed May 7, 2013.*
Wikipedia article on photodissociation, accessed May 29, 2013.*
Extra-Terrestrial Water Extraction, Geyer et al., May 26, 2005.*
NASA's Advanced Automation for Space Missions: Chapter 5.3, found at http://www.islandone.org/MMSG/aasm/AASM53.htmll, accessed May 7, 2013.*
40th Lunar and Planetary Science Conference: "Physical and Thermodynamical Evidence for Liquid Water on Mars?" Mar. 2009.*
Wurz: "The lunar exosphere: The sputtering contribution", May 2007.*
Wikipedia article on "Atmosphere of the Moon", accessed May 29, 2013.*
"University of Tennessee study confirms solar wind as source for moon water", Oct. 2012.*
Wikipedia article on "Outer space", accessed May 29, 2013.*
Brandt, "Density of the lunar atmosphere," Science, vol. 131, No. 3412, May 27, 1960, p. 1606.
Firsoff et al., "Density of the lunar atmosphere," Science, vol. 131, No. 3414, Jun. 3, 1960, pp. 1669-1671.
Öpik et al., "Density of the lunar atmosphere," Science, vol. 133, No. 3462, May 5, 1961, pp. 1419-1420.
Astrobotic Technology, Inc., "Lander & rover payload user's guide," v2.5, (selected pages), http://astrobotic.net/wp-content/uploads/2011/09/AstroboticTechnologyPayloadUserGuide_v2.5.pdf (accessed Sep. 14, 2012).

(Continued)

*Primary Examiner* — Christopher P Jones
(74) *Attorney, Agent, or Firm* — Boies, Schiller & Flexner LLP (57) ABSTRACT

To obtain water on the Moon, ambient water is collected from space by depositing on the lunar surface a drying agent that is suitable for use in high vacuum to capture the impinging moisture. Advantageously, the inventive methods enable ambient water in space to be exploited as a renewable resource even on non-polar and sunlit surfaces of the Moon.

20 Claims, 4 Drawing Sheets

Earth and Moon Orbits

(56) References Cited

OTHER PUBLICATIONS

Associated Press, "Moon rock' in Dutch museum is just petrified wood," USA Today, Aug. 27, 2009, http://www.usatoday.com/news/offbeat/2009-08-27-moon-rock-museum_N.htm (accessed Aug. 23, 2012).

Mirabel et al., "A theory for the deliquescence of small particles," CP534, Nucleation and Atmospheric Aerosols 2000: 15th Int'l Conf., edited by B. N. Hale and M. Kulmala, pp. 41-44.

Agle et al., "NASA instruments reveal water molecules on lunar surface," NASA Mission News, Sep. 24, 2009, http://www.nasa.gov/topics/moonmars/features/moon20090924.html (accessed Jun. 30, 2012).

Lucey, "A lunar waterworld," Science, vol. 326, No. 5952, Oct. 23, 2009, pp. 531-532 (first announced Sep. 24, 2009).

Clark, "Detection of adsorbed water and hydroxyl on the Moon," Science, vol. 326, No. 5952, Oct. 23, 2009, pp. 562-564 (first announced Sep. 24, 2009).

Sunshine et al., "Temporal and spatial variability of lunar hydration as observed by the deep impact spacecraft," Science, vol. 326, No. 5952, Oct. 23, 2009, pp. 565-568 (first announced Sep. 24, 2009).

Pieters et al., "Character and spatial distribution of OH/H2O on the surface of the Moon seen by M3 on Chandrayaan-1," Science, vol. 326, No. 5952, Oct. 23, 2009, pp. 568-572 (first announced Sep. 24, 2009).

NASA Photojournal, "PIA12222: Water abundances change with time of day," Image: PIA12222.tif (2.253 MB), Image Credit: NASA/JPL-Caltech/Univ. of Maryland, Image Addition Date: Sep. 24, 2009, Website:http://photojournal.jpl.nasa.gov/catalog/PIA12222 (accessed Aug. 30, 2012).

NASA Photojournal, "PIA12223: Water abundance dependent on temperature," Image: PIA12223.tif (2.253 MB), Image Credit: NASA/JPL-Caltech/Univ. of Maryland, Image Addition Date: Sep. 24, 2009, Website: http://photojournal.jpl.nasa.gov/catalog/PIA12223 (accessed Aug. 30, 2012).

NASA Photojournal, "PIA12224: Deep Impact identifies water on the lunar surface," Image: PIA12224.tif (1.487 MB), Image Credit: NASA/JPL-Caltech/Univ. of Maryland, Image Addition Date: Sep. 24, 2009, Website: http://photojournal.jpl.nasa.gov/catalog/PIA12224 (accessed Aug. 30, 2012).

NASA Photojournal, "PIA12228: Cassini's look at water on the Moon," Image: PIA12228.tif (2.707 MB), Image Credit: NASA/JPL-Caltech/Univ. of Maryland, Image Addition Date: Sep. 24, 2009, Website: http://photojournal.jpl.nasa.gov/catalog/PIA12228 (accessed Aug. 30, 2012).

NASA Photojournal, "PIA12235: Nearside of the Moon," Image: PIA12235.tif (8.411 MB), Image Credit: ISRO/NASA/JPL-Caltech/Brown Univ., Image Addition Date: Sep. 24, 2009, Website: http://photojournal.jpl.nasa.gov/catalog/PIA12235 (accessed Aug. 30, 2012).

NASA Photojournal, "PIA12237: Water detected at high latitudes," Image: PIA12237.tif (11.42 MB), Image Credit: ISRO/NASA/JPL-Caltech/Brown Univ./USGS, Addition Date: Sep. 24, 2009, Website: http://photojournal.jpl.nasa.gov/catalog/PIA12237 (accessed Aug. 30, 2012).

Hurtley, "This week in Science," Science, vol. 326, No. 5952, Oct. 23, 2009, pp. 498-499; "Lunar Water," p. 498.

Gloeckler et al., "Extended inner heliospheric source of pickup ions," Eos Transactions of the American Geophysical Union, vol. 89, No. 53, Fall Meet. Suppl., Dec. 2008, Abstract U12A-03.

Sridharan et al., "'Direct' evidence for water (H2O) in the sunlit lunar ambience from CHACE on MIP of Chandrayaan I," Planetary and Space Science, vol. 58, No. 6, May 2010, pp. 947-950 (available online Mar. 6, 2010).

Sridharan et al., "The sunlit lunar atmosphere: A comprehensive study by CHACE on the Moon Impact Probe of Chandrayaan-1," Planetary and Space Science, vol. 58, No. 12, Oct. 2010, pp. 1567-1577 (available online Aug. 6, 2010).

Sridharan et al., "Spatial heterogeneity in the radiogenic activity of the lunar interior: Inferences from CHACE and LLRI on Chandrayaan-1," Advances in Space Research, in Press (available online Aug. 27, 2012).

Ramachandran, "Chandrayaan: Moon mystery," Frontline (India's National Magazine), vol. 27, No. 20, Sep. 25-Oct. 8, 2010, http://www.flonnet.com/fl2720/stories/20101008272009000.htm (accessed Sep. 6, 2012).

Hoffman et al., "Lunar orbital mass spectrometer experiment," Apollo 15 Preliminary Science Report, NASA SP-289, 1972, pp. 19-1 to 19-7.

Hodges et al., "Lunar orbital mass spectrometer experiment," Apollo 16 Preliminary Science Report, NASA SP-315, 1972, pp. 21-1 to 21-6.

Colaprete et al., "Detection of water in the LCROSS ejecta plume," vol. 330, No. 6003, Oct. 22, 2010, pp. 463-468.

Dino, "LCROSS impact data indicates water on Moon," NASA Mission Update, Nov. 13, 2009, http://www.nasa.gov/mission_pages/LCROSS/main/prelim_water_results.html (accessed Sep. 15, 2012).

Hong et al., "A ground-based observation of the LCROSS impact events using the Subaru Telescope," Icarus, vol. 214, No. 1, Jul. 2010. pp. 21-29.

Stewart et al., "Simulations of a comet impact on the Moon and associated ice deposition in polar cold traps," Icarus, vol. 215, No. 1, Sep. 2011, pp. 1-16.

Martinez et al., "Cassini tastes organic material at Saturn's geyser moon," NASA Mission News, Mar. 26, 2008, http://www.nasa.gov/mission_pages/cassini/media/cassini-20080326.html (accessed Aug. 13, 2012).

Cook et al., "Cassini captures ocean-like spray at saturn moon," NASA Mission News, Jun. 22, 2011, http://www.nasa.gov/mission_pages/cassini/whycassini/cassini20110622.html (accessed Aug. 13, 2012).

Postberg et al., "A salt-water reservoir as the source of a compositionally stratified plume on Enceladus," Nature, vol. 474, No. 7353, Jun. 30, 2011, pp. 620-622 (published online Jun. 22, 2011).

Khurana et al., "Induced magnetic fields as evidence for subsurface oceans in Europa and Callisto," Nature, vol. 395, No. 6704, Oct. 22, 1998, pp. 777-780.

McCord et al., "Salts on Europa's surface detected by Galileo's near infrared mapping spectrometer," Science, vol. 280, No. 5367, May 22, 1998, pp. 1242-1245.

McCord et al., "Hydrated salt minerals on Ganymede's surface: Evidence of an ocean below," Science, vol. 292, No. 5521, May 25, 2001, pp. 1523-1525.

Carlson et al., "Sulfuric acid on Europa and the radiolytic sulfur cycle," Science, vol. 286, No. 5437, Oct. 1, 1999, pp. 97-99.

Zurbuchen et al., "MESSENGER observations of the composition of Mercury's ionized exosphere and plasma environment," Science, vol. 321, No. 5885, Jul. 4, 2008, pp. 90-92.

Webster et al., "NASA rover finds old streambed on Martian surface," NASA Mission News, Sep. 27, 2012, http://www.nasa.gov/mission_pages/msl/news/msl20120927.html (accessed Sep. 27, 2012).

Dolezalek et al., "Atmospheric electricity," CRC Handbook of Chemistry and Physics, 84th Ed., D.R. Lide, editor, Boca Raton, FL: CRC Press, 2003, pp. 14-33 to 14-40.

Strobel, "Astronomy notes: Planetary science—Atmospheres," Last Update: Jun. 12, 2010, http://www.astronomynotes.com/solarsys/s3.htm (accessed Aug. 27, 2012).

Strobel, "Astronomy notes: Planetary science—Magnetic fields," Last Update: Jun. 2, 2010, http://www.astronomynotes.com/solarsys/s7.htm (accessed Aug. 27, 2012).

Waite et al., "Cassini ion and neutral mass spectrometer: Enceladus plume composition and structure," Science, vol. 311, No. 5766, Mar. 10, 2006, pp. 1419-1422.

Hansen et al., "The composition and structure of the Enceladus plume," Geophysical Research Letters, vol. 38, No. L11202, 2011, pp. 1-5.

Hansen et al., "Enceladus' Water Vapor Plume," Science, vol. 311, No. 5766, Mar. 10, 2006, pp. 1422-1425.

(56) References Cited

OTHER PUBLICATIONS

Saal et al., "Volatile content of lunar volcanic glasses and the presence of water in the Moon's interior," Nature, vol. 454, No. 7201, Jul. 10, 2008, pp. 192-195.
Sharp et al., "The chlorine isotope composition of the Moon and implications for an anhydrous mantle," Science, vol. 329, No. 5995, Aug. 27, 2010, pp. 1050-1053 (published online Aug. 5, 2010).
Ichimura et al., "Hydroxyl (OH) production on airless planetary bodies: Evidence from H+/D+ ion-beam experiments," Earth and Planetary Science Letters, vol. 345-348, Sep. 2012, pp. 90-94.
Wieser et al., "Extremely high reflection of solar wind protons as neutral hydrogen atoms from regolith in space," Planetary and Space Science, vol. 57, Nos. 14-15, Dec. 2009, pp. 2132-2134 (Erratum in: vol. 59, No. 8, Jun. 2011, pp. 798-799).
Zeller et al., "Chemical alterations resulting from proton irradiation of the lunar surface," Modern Geology, vol. 1, 1970, pp. 141-148.
Fastie et al., "A search for far-ultraviolet emissions from the lunar atmosphere," Science, vol. 182, No. 4113, Nov. 16, 1973, pp. 710-711.
Fastie et al., "Ultraviolet spectrometer experiment," Apollo 17 Preliminary Science Report, NASA S-330, 1973, pp. 23-1 to 23-10.
Thomas, "Mercury: Does its atmosphere contain water?" Science, vol. 183, No. 4130, Mar. 22, 1974, pp. 1197-1198.
Stimpfl et al., "An angstrom sized window on the origin of water in the inner solar system: Atomistic simulation of adsorption of water on olivine," Eos Transactions of the American Geophysical Union, vol. 86, No. 52, Fall Meet. Suppl., Dec. 2005, Abstract P51A-0903.
Stimpfl et al., "An angstrom-sized window on the origin of water in the inner solar system: Atomistic simulation of adsorption of water on olivine," Journal of Crystal Growth, vol. 294, No. 1, Aug. 15, 2006, pp. 83-95 (2006) 83-95 (available online Aug. 9, 2006).
Feldman et al., "Fluxes of fast and epithermal neutrons from Lunar Prospector: Evidence for water ice at the lunar poles," Science, vol. 281, No. 5382, Sep. 4, 1998, pp. 1496-1500.
Feldman et al., "Evidence for water ice near the lunar poles," Journal of Geophysical Research, vol. 106, No. E10, Oct. 25, 2001, pp. 23,231-23,251.
Eke et al., "The spatial distribution of polar hydrogen deposits on the Moon," Icarus, vol. 200, No. 1, Mar. 2009, pp. 12-18.
Starukhina et al., "The lunar poles: Water ice or chemically trapped hydrogen?" Icarus, vol. 147, No. 2, Oct. 2000, pp. 585-587.
Lunarpedia (Lunar Temperature), http://www.lunarpedia.org/index.php?title=Lunar_Temperature (accessed Oct. 27, 2012).
Langseth et al., "Heat-flow experiment," Apollo 15 Preliminary Science Report, NASA SP-289, 1972, pp. 11-1 to 11-23.
Langseth et al., "Heat flow experiment," Apollo 17 Preliminary Science Report, NASA SP-330, 1979, pp. 9-1 to 9-24.
Helmenstine, "Melting snow & ice with salt: Colligative properties and freezing point depression," About.com Guide, http://chemistry.about.com/cs/howthingswork/a/aa120703a.htm (accessed Oct. 13, 2012).
Smith et al., "Hydration of plutonium oxide and process salts, NaCl, KCl, CaCl2, MgCl2: Effect of calcination on residual water and rehydration," Waste Management, vol. 20, No. 7, Nov. 2000, pp. 479-490.
Irion, "Moon on the rocks, hold the ice," ScienceNow, Nov. 12, 2003, http://news.sciencemag.org/sciencenow/2003/11/12-01.html (accessed Sep. 17, 2012).
Kerr, "A dry Moon after all?" ScienceNow, Oct. 18, 2006, http://news.sciencemag.org/sciencenow/2006/10/18-01.html (accessed Sep. 17, 2012).
Kerr, "Two missions go in search of a watery lunar bonanza," Science, vol. 324, No. 5929, May 15, 2009, pp. 878-879.
Kerr, "A whiff of water found on the Moon," ScienceNow, Sep. 24, 2009, http://news.sciencemag.org/sciencenow/2009/09/24-01.html (accessed Sep. 17, 2012).
Kerr, "Moon impact: NASA plays down lack of fireworks," ScienceNow, Oct. 9, 2009, http://news.sciencemag.org/sciencenow/2009/10/09-01.html (accessed Sep. 17, 2012).
Kerr, "The Moon is wet!" ScienceNow, Nov. 13, 2009, http://news.sciencemag.org/sciencenow/2009111/13-01.html (accessed Sep. 17, 2012).
The News Staff, "The runners-up," Science, vol. 326, No. 5960, Dec. 18, 2009, pp. 1600-1607; Mervis et al., "An icy Moon revealed," p. 1603.
Berardelli, "Beneath the surface, the Moon is dry as a bone," ScienceNow, Aug. 6, 2010, http://news.sciencemag.org/sciencenow/2010/08/beneath-the-surface-the-moon-is-html (accessed Sep. 17, 2012).
Kerr, "How wet the Moon? Just damp enough to be interesting," Science, vol. 330, No. 6003, Oct. 22, 2010, p. 434.
Wikipedia (Antifreeze), http://en.wikipedia.org/wiki/Antifreeze (accessed Oct. 27, 2012).
Wikipedia (Apollo 15), http://en.wikipedia.org/wiki/Apollo_15 (accessed Oct. 27, 2012).
Wikipedia (Apollo 17), http://en.wikipedia.org/wiki/Apollo_17 (accessed Oct. 27, 2012).
Wikipedia (Bussard ramjet), http://en.wikipedia.org/wiki/Bussard_ramjet (accessed Oct. 27, 2012).
Wikipedia (Calcium chloride), http://en.wikipedia.org/wiki/Calcium_chloride (accessed Oct. 27, 2012).
Wikipedia (Dynamic pressure), http://en.wikipedia.org/wiki/Dynamic_pressure, (accessed Oct. 27, 2012).
Wikipedia (Earth), http://en.wikipedia.org/wiki/Earth (accessed Oct. 27, 2012).
Wikipedia (Enceladus (moon)), http://en.wikipedia.org/wiki/Enceladus_(moon) accessed Oct. 27, 2012).
Wikipedia (Ethanol), http://en.wikipedia.org/wiki/Ethanol (accessed Oct. 27, 2012).
Wikipedia (Exosphere), http://en.wikipedia.org/wiki/Exosphere (accessed Oct. 27, 2012).
Wikipedia (Kinetic theory), http://en.wikipedia.org/wiki/Kinetic_theory (accessed Oct. 27, 2012).
Wikipedia (Interstellar travel), http://en.wikipedia.org/wiki/Interstellar_travel (accessed Oct. 27, 2012).
Wikipedia (Luna 16), http://en.wikipedia.org/wiki/Luna_16 (accessed Oct. 27, 2012).
Wikipedia (Luna 24), http://en.wikipedia.org/wiki/Luna_24 (accessed Oct. 27, 2012).
Wikipedia (Lunar day), http://en.wikipedia.org/wiki/Lunar_day (accessed Oct. 27, 2012).
Wikipedia (Moon), http://en.wikipedia.org/wiki/Moon (accessed Oct. 27, 2012).
Wikipedia (NASA), http://en.wikipedia.org/wiki/Nasa (accessed Oct. 27, 2012).
Wikipedia (Orbit of the Moon), http://en.wikipedia.org/wiki/Orbit_of the_Moon (accessed Oct. 27, 2012).
Wikipedia (Outer space), http://en.wikipedia.org/wiki/Outer_space (accessed Oct. 27, 2012).
Wikipedia (Propylene glycol), http://en.wikipedia.org/wiki/Propylene_glycol, (accessed Oct. 27, 20122).
Wikipedia (Solar wind), http://en.wikipedia.org/wiki/Solar_wind (accessed Oct. 27, 2012).
Postberg et al., "Sodium salts in E-ring ice grains from an ocean below the surface of Enceladus," Nature, vol. 459, No. 7250, Jun. 25, 2009, pp. 1098-1101.
Van Werven, "Moon map," Arno's Homepage, Buehler Planetarium and Observatory (Davie, FL), http://www.ilovestars.com/Moon/moonmap.php (accessed Sep. 17, 2012).
Meyer, "The Lunar Petrographic Educational Thin Section Set," Astromaterials Curation, NASA Lyndon B. Johnson Space Center, Houston, TX: Sep. 2003, (selected pages), http://curator.jsc.nasa.gov/Education/LPETSS/documents/CMEYER_booklet2003.pdf (accessed Jun. 30, 2012).
Moore et al, "Total carbon and nitrogen abundances in lunar samples," Science, vol. 167, No. 3918, The Moon Issue, Jan. 30, 1970, pp. 495-497.
Dunn, "Certain reasons for a lunar atmosphere," Philosophical Transactions, vol. 52, 1761-1762, pp. 578-580.
Howard, "The Moon's atmosphere," Science, vol. 21, No. 534, Apr. 28, 1893, p. 233.

(56) References Cited

OTHER PUBLICATIONS

Herring et al., "Effect of the solar wind on the lunar atmosphere," Science, vol. 130, No. 3370, Jul. 31, 1959, p. 266.
Öpik et al., "Escape of gases from the Moon," Journal of Geophysical Research, vol. 65, No. 10, Oct. 1960, pp. 3065-3030.
Öpik, "The lunar atmosphere," Planetary and Space Science, vol. 9, No. 5, May 1962, pp. 211-244.
Crider et al., "Hydrogen migration to the lunar poles by solar wind bombardment of the moon," Advances in Space Research, vol. 30, No. 8, Oct. 2002, pp. 1869-1874.
Firsoff, "Dissipation of planetary atmospheres," Science, vol. 130, No. 3385, Nov. 13, 1959, pp. 1337-1338.
NASA SP-7, "Dictionary of Technical Terms for Aerospace Use," edited by William H. Allen, Scientific and Technical Information Division, National Aeronautics and Space Administration, Washington, D.C.: U.S. Government Printing Office, 1965; p. 24, atmospheric entry.
Wikipedia (Local Interstellar Cloud), http://en.wikipedia.org/wiki/Local_Interstellar_Cloud (accessed Sep. 2, 2013).
NASA SP-350, "Apollo Expeditions to the Moon," edited by Edgar M. Cortright, Scientific and Technical Information Division, National Aeronautics and Space Administration, Washington, D.C.: U.S. Government Printing Office, 1975; pp. 189-190 (George E. Mueller, "First Manned Flight of the LM," In: Ch. 10).
Wikipedia (Apollo Lunar Module), http://en.wikipedia.org/wiki/Apollo_Lunar_Module (accessed Sep. 21, 2013).
Spitz et al., "Dictionary of Astronomy and Astronautics," New York, NY: Philosophical Library, 1959; atmosphere (p. 36), atmosphere of the earth (pp. 36-37), deep space (p. 117), moon (pp. 260-262), outer space (p. 287), space (p. 361).
Field et al., "Molecular Synthesis in Interstellar Clouds: The Radiative Association Reaction $H + OH \rightarrow H2O + hv$," Monthly Notices of the Royal Astronomical Society, vol. 192, Jul. 1980, pp. 1-10.
Oberg, "Space Exploration," In: World Book Encyclopedia, vol. 18 (So-Sz), Chicago, IL: World Book, 2001, pp. 694-729; p. 696 ("Space exploration terms" and "What is space?").
NASA SP-350, "Apollo Expeditions to the Moon," edited by Edgar M. Cortright, Scientific and Technical Information Division, National Aeronautics and Space Administration, Washington, D.C.: U.S. Government Printing Office, 1975; pp. 156-157 (Robert Sherrod, "Protecting Men for Their Steps on the Moon," In: Ch. 8).
Wikipedia (Kármán line), http://en.wikipedia.org/wiki/Karman_Line (accessed Sep. 9, 2013).
Wikipedia (Extra-vehicular activity), http://en.wikipedia.org/wiki/Extravehicular_activity (accessed Sep. 9, 2013).
Wikipedia (Spaceflight), http://en.wikipedia.org/wiki/Spaceflight (accessed Sep. 9, 2013).
NASA Space Center Roundup, Lyndon B. Johnson Space Center, Houston, TX, vol. 40, No. 11, Jun. 15, 2001, pp. 1-7.
NASA, "Extravehicular Activity System (EVA)," Space Station Live!, http://spacestationlive.nasa.gov/secondarysys/index.html (accessed Aug. 3, 2013).
NASA SP-168, "Exploring Space with a Camera," compiled and edited by Edgard M. Cortright, Scientific and Technical Information Division, Office of Information Division, Office of Technology Utilization, National Aeronautics and Space Administration, Washington, D.C., 1968, pp. 76-77 ("Lessons in the Lunar Soil").
Mirabel et al., "A Theory for the Deliquescence of Small Particles," Journal of Chemical Physics, vol. 113, No. 18, 2000, pp. 8200-8205.
Shearer, "Calcium Chloride," In: Kirk-Othmer Encyclopedia of Chemical Technology, vol. 4, New York, NY: John Wiley & Sons, 1978, pp. 432-436.
Liu et al., "Direct Measurement of Hydroxyl in the Lunar Regolith and the Origin of Lunar Surface Water," Nature Geoscience, vol. 5, No. 11, Nov. 2012, pp. 779-782 (available online Oct. 14, 2012).
Brown University, "Moon and Earth Have Common Water Source," ScienceDaily, May 9, 2013, http://www.sciencedaily.com/releases/2013/051130509142054.htm (accessed Jun. 1, 2013).
Saal et al., "Hydrogen Isotopes in Lunar Volcanic Glasses and Melt Inclusions Reveal a Carbonaceous Chondrite Heritage," Science, vol. 340, No. 6138, Jun. 14, 2013, pp. 1317-1320 (available online May 9, 2013).
Barry et al., "Lunar LADEE," NASA Solar System Exploration, http://solarsystem.nasa.gov/scitech/display.cfm?ST_ID=2286, Oct. 23, 2009 (accessed Aug. 14, 2013).
Blitz, "Interstellar Molecular Clouds," In: Encyclopedia of Astronomy and Astrophysics, Editor-in-Chief Paul Murdin, New York: Nature Pub. Group, 2001, pp. 1286-1294.
Gloeckler et al., "Composition of the Inner Source Measured with the Solar Wind Ion Composition Spectrometer on Ulysses," in Twelfth International Solar Wind Conference held Jun. 21-26, 2009 in Saint-Malo, France, Eds. M. Maksimovic et al., American Institute of Physics, Conference Proceeding, vol. 1216, 2010, (available online Apr. 4, 2010), pp. 514-517.
Wikipedia (Atmosphere of the Earth), http://en.wikipedia.org/wiki/Atmosphere_of_the_earth (accessed Aug. 14, 2013).
Wikipedia (Calcium Sulfate), http://en.wikipedia.org/wiki/Calcium_sulfate (accessed Aug. 14, 2013).
Wikipedia (Exosphere), http://en.wikipedia.org/wiki/Exosphere (accessed Aug. 14, 2013).
Wikipedia (Hubble Space Telescope), http://en.wikipedia.org/wiki/Hubble_space_telescope (accessed Aug. 14, 2013).
Wikipedia (Solubility), http://en.wikipedia.org/wiki/Solubility (accessed Aug. 14, 2013).
Wikipedia (Sun), http://en.wikipedia.org/wiki/Sun (accessed Aug. 14, 2013).
Wikipedia (Plasma (physics)), http://en.wikipedia.org/wiki/Plasma_(physics) (accessed Aug. 14, 2013).
NASA Photojournal, "PIA14011: Nearside Spectacular," PIA14011.tif (1.962 MB), Image Credit: NASA/GSFC/Arizona State Univ., Image Addition Date: Feb. 21, 2011, Website: http://photojournal.jpl.nasa.gov/catalog/PIA14011 (accessed Jun. 1, 2013).
Kartographisches Institut Bertelsmann, The Book of the World, rev. ed., 2nd U.S. ed., MacMillan USA: New York, 1999; p. 4.
Kasting et al., "Loss of water from Venus. I. Hydrodynamic escape of hydrogen," Icarus, vol. 53, No. 3, 1983, pp. 479-508.
Kulikov et al., "Atmospheric and water loss from early Venus," Planetary and Space Science, vol. 54, Nos. 13-14, 2006, pp. 1425-1444.
Lammer et al., "Loss of hydrogen and oxygen from the upper atmosphere of Venus," Planetary and Space Science, vol. 54, Nos. 13-14, 2006, pp. 1445-1456.
Talbi et al., "The formation of H2O from the radiative association of O and H2," Chemical Physics Letters, vol. 485, Nos. 1-3, 2010, pp. 56-58.
Michel, "Interaction between the solar wind and the lunar atmosphere," Planetary and Space Science, vol. 12, No. 11, 1964, pp. 1075-1091.
Siscoe et al., "Upper limits on the lunar atmosphere determined from solar-wind measurements," Journal of Geophysical Research, vol. 77, No. 31, 1972, pp. 6042-6051.
Siscoe et al., "Solar wind-Mercury atmosphere interaction: Determination of the planet's atmospheric density," Journal of Geophysical Research, vol. 78, No. 19, 1973, pp. 3961-3964.
Mukherjee et al., "Possible sources of water on the Moon," Journal of Geophysical Research, vol. 78, No. 11, 1973, pp. 1741-1752.
Freeman et al., "Observations of water vapor ions at the lunar surface," Moon, vol. 8, Nos. 1-2, 1973, pp. 115-128.
Freeman et al., "The Apollo lunar surface water vapor event revisited," Geophysical Research Letters, vol. 18, No. 11, 1991, pp. 2109-2112.
Akhmanova et al., "Possible water in Luna 24 regolith from the Sea of Crises," Geochemistry International, vol. 15, No. 1, 1978, pp. 166-168.
Burke et al., "Solar wind contribution to surficial lunar water: Laboratory investigations," Icarus, vol. 211, No. 2, pp. 1082-1088, 2011.
Managadze et al., "Simulating OH/H2O formation by solar wind at the lunar surface," Icarus, vol. 215, No. 1, 2011, pp. 449-451.
Gloeckler et al., "Elemental composition of the inner source pickup ions," Journal of Geophysical Research, vol. 105, No. A4, 2000, pp. 7459-7463.

(56) References Cited

OTHER PUBLICATIONS

Hartogh et al., "Ocean-like water in the Jupiter-family comet 103P/Hartley 2," Nature, vol. 218, No. 7368, 2011, pp. 218-220.
Crider et al., "The solar wind as a possible source of lunar polar hydrogen deposits," Journal of Geophysical Research, vol. 105, No. E11, 2000, pp. 26,773-26,782.
Sanin et al., "Testing lunar permanently shadowed regions for water ice: LEND results from LRO," Journal of Geophysical Research, vol. 117, E00H26, 2012, pp. 1-13.
McGovern et al., "Mapping and characterization of non-polar permanent shadows on the lunar surface," Icarus, vol. 223, No. 1, 2013, 566-581.
Campbell et al., "Radar imaging of the lunar poles," Nature, vol. 426, No. 6963, 2003, pp. 137-138.
Hoffman et al., "Lunar atmospheric composition experiment," Apollo 17 Preliminary Science Report, NASA SP-330, 1973, pp. 17-1 to 17-9.
Siceloff, "Rover's exploration may lead to deep space," NASA Online Article, Jun. 22, 2012, http://www.nasa.gov/exploration/systems/ground/resolverover_prt.htm (accessed Sep. 9, 2013).
Stern, "The lunar atmosphere: History, status, current problems, and context," Reviews of Geophysics, vol. 37, No. 4, 1999, pp. 453-491.
Wikipedia (Mean free path), http://en.wikipedia.org/wiki/Mean_free_path (accessed Dec. 8, 2013).
McCord et al., "Sources and physical processes responsible for OH/H2O in the lunar soil as revealed by the Moon Mineralogy Mapper (M3)," Journal of Geophysical Research, vol. 116, E00G05, 2011, pp. 1-22.
Boyce et al., "Lunar apatite with terrestrial volatile abundances," Nature, vol. 466, No. 7305, 2010, pp. 466-469.
Vondrak, "Lunar base activities and the lunar environment," In: The Second Conference on Lunar Bases and Space Activities of the 21st Century (Apr. 5-7, 1988; Houston, TX), edited by W.W. Mendell, NASA Conferences Publication 3166, vol. 1, Part 4, 1992, pp. 337-345.
Burns et al., "An artificially generated atmosphere near a lunar base," In: The Second Conference on Lunar Bases and Space Activities of the 21st Century (Apr. 5-7, 1988; Houston, TX), edited by W.W. Mendell, NASA Conferences Publication 3166, vol. 1, Part 4, 1992, pp. 347-350.
Haskin, "Water and cheese from the lunar desert: Abundances and accessibility of H, C, and N on the Moon," In: The Second Conference on Lunar Bases and Space Activities of the 21st Century (Apr. 5-7, 1988; Houston, TX), edited by W.W. Mendell, NASA Conferences Publication 3166, vol. 2, Part 5, 1992, pp. 393-396.
Bustin et al., "Availability of hydrogen for lunar base activities," In: The Second Conference on Lunar Bases and Space Activities of the 21st Century (Apr. 5-7, 1988; Houston, TX), edited by W.W. Mendell, NASA Conferences Publication 3166, vol. 2, Part 5, 1992, pp. 437-445.
Wang et al., "Lunar exosphere influence on lunar-based near-ultraviolet astronomical observations," Advances in Space Research, vol. 48, No. 12, 2011, pp. 1927-1934.
Borra et al., "Deposition of Metal Films on an Ionic Liquid as a Basis for a Lunar Telescope," Nature, vol. 447, No. 7147, 2007, pp. 979-981.
Cuadrado-Prado et al., "Experimental Measurement of the Hygroscopic Grade on Eight Imidazolium Based Ionic Liquids," Fluid Phase Equilibria, vol. 278, Nos. 1-2, 2009, pp. 36-40.
Endres, "Physical Chemistry of Ionic Liquids," Physical Chemistry Chemical Physics, vol. 12, No. 8, 2010, p. 1648.
Fischer et al., "Experimental Demonstration of the Formation of Liquid Brines under Martian Polar Conditions in the Michigan Mars Environmental Chamber," Geophysical Research Abstracts, vol. 16, EGU2014-9162, 2014.
Janz et al., "Physical Properties Data Compilations Relevant to Energy Storage. I. Molten Salts: Eutectic Data," National Standard Reference Data Series, National Bureau of Standards (U.S.), vol. 61, Part 1, 1978; excerpted from cover to p. 10.
Merriam-Webster's Collegiate Dictionary, 11th ed., Merriam-Webster: Springfield, MA, 2008: deliquescent (def. 1), p. 330; deliquesce (def. 1), p. 330.
Widegren et al., "Relative Volatilities of Ionic Liquids by Vacuum Distillation of Mixtures," Journal of Chemical Physics B, vol. 111, No. 30, 2007, pp. 8959-8964.
Wikipedia (Ionic liquid), http://en.wikipedia.org/wiki/Ionic_liquid (accessed May 21, 2014).
Wikipedia (Nanostructure), http://en.wikipedia.org/wiki/Nanostructure (accessed May 21, 2014).
Wikipedia (Particle-size distribution), http://en.wikipedia.org/wiki/Particle-size_distribution (accessed May 21, 2014).
Wikipedia (Raoult's law), http://en.wikipedia.org/wiki/Raoult's_law (accessed May 21, 2014).
Martin-Torres, "Transient liquid water and water activity at Gale crater on Mars," Nature Geoscience, advance publication online Apr. 13, 2015, DOI: 10.1038/NGEO2412.
Klotz, "Briny water may pool in Mars' equatorial soil," Discovery News, Apr. 13, 2015, http://news.discovery.com/space/briny-water-may-pool-in-mars-equatorial-soil-150413.htm (accessed Apr. 26, 2015).
Yoe, J.H. "Efficiency of Drying Agents." Handbook of Chemistry and Physics. 72nd ed. Boca Raton, FL: CRC Press, 1991. p. 15-22.
Califorrniaa, "Influence of the lunar ambience on dynamic surface hydration on sunlit regions of the Moon," Advances in Space Research, vol. 55, No. 6, 2015, pp. 1705-1709 (available online Jan. 2, 2015).
Bradley et al., "Detection of solar wind-produced water in irradiated rims on silicate minerals," Proceedings of the National Academy of Sciences of the United States of America, vol. 111, No. 5, Feb. 4, 2014, pp. 1732-1735.
Stephant et al., "The negligible chondritic contribution in the lunar soils water," Proceedings of the National Academy of Sciences of the United States of America, vol. 111, No. 42, Oct. 21, 2014, pp, 15007-15012.

\* cited by examiner

Earth and Moon Orbits

FIG. 1

Rocket Delivers Magnesium Chloride to Moon
FIG. 2A

Magnesium Chloride Deposited on Lunar Surface
FIG. 2B

Magnesium Chloride Collects Water from Space
FIG. 2C

Water Soluble Salt Located Near Lunar Surface

FIG. 3A

Surface Seeded with Deliquescent Substance

FIG. 3B

Surface Collects Solar Moisture

FIG. 3C

Surface Water Leaches Salt Underneath

FIG. 3D

Source: Grayscale conversion of data from the NASA-built Moon Mineralogy Mapper (M3) carried by Chandrayaan-1

Crater Wetness Follows Shadow Pattern
FIG. 4

METHOD OF COLLECTING WATER ON THE MOON

PROPERTY RIGHTS STATEMENT TO NASA

The invention was not made under nor is there any relationship of the invention to the performance of any work under any contract of the National Aeronautics and Space Administration (NASA).

BACKGROUND OF THE INVENTION

1. Field of the Invention

My invention relates to a method of collecting water on the Moon.

2. Prior Art

The prior art teaches that water must be brought to the Moon in the form of bulk parcels, e.g., manually by spacecraft or celestially by comet, or that conversion of lunar matter into water is required, e.g., by combination of hydrogen and oxygen after evolution from lunar matter.

3. Statement of the Necessity

The uses of water are well known. In order to further lunar development, a large supply of water is desirable on the Moon.

But bringing water to the Moon manually by spacecraft is impractical in large quantities due to the weight of water and the cost of space travel from Earth to the Moon. Relying on comets to bring water to the Moon is impractical due to the rarity and unpredictability of comets. Conversion of lunar matter into water requires specialized chemical and mineral processing equipment, and, depending on the conversion method, large amounts of energy may be required.

In contrast to the limitations imposed by prior art methodologies, it would be desirable to have a means of supplying water to the Moon that does not require water parcel delivery or conversion of lunar matter into water.

What is needed is a method of collecting water on the Moon.

BRIEF SUMMARY OF THE INVENTION

My invention satisfies the above-stated needs.

In a preferred embodiment, the invention comprises depositing a deliquescent substance such as magnesium chloride ($MgCl_2$) on a surface of the Moon to collect ambient moisture from outer space.

BRIEF DESCRIPTION OF THE SEVERAL VIEWS OF THE DRAWING

FIG. 2C is most descriptive of the invention.

DETAILED DESCRIPTION OF THE INVENTION

My invention is a method of collecting water on the Moon. The invention may be appreciated in view of a theory of operation.

1. Theory of Operation

In this disclosure, the Earth is classified as a tropical planet (or, to borrow from the Köppen climate classification system, a tropical rain forest planet). As an example of contrast, Mars is classified as a semitropical planet (or, to borrow from the Köppen climate classification system, a tropical wet and dry or savanna planet). The basis for these distinctions is that outer space contains a faint quantity of moisture, called solar moisture. Earth orbits in a tropical (rain forest) region of solar moisture. This means that in relative terms the Earth is always in a "wet" region of space. In contrast, Mars orbits in a semitropical region of space. Over geologic time, this means Mars experiences "wet" and "dry" seasons. In other words, the pattern of solar moisture shifts seasonally—meaning, over geologic time—and right now Mars is in its "dry" season.

Even though solar moisture is extremely faint, the Earth sweeps out an immense toroidal volume in its yearly journey around the Sun. In doing so, the Earth acts like a big catcher's mitt, sweeping out solar moisture in its orbital path. A state of equilibrium called hydrostasis is achieved when an amount of solar moisture encountered equals an amount of moisture escaping from Earth. Over geologic time, seasonal variations in equilibrium occur. In other words, the Earth's moisture content is not a fixed value, but depends on a contrast between the moisture content of space encountered in the Earth's orbital path and the amount of moisture escaping from the Earth. Importantly, in addition to gravity, salt helps the Earth to retain its moisture.

In this disclosure, the term "geopooling" (geo-pooling) is coined to mean the process by which a celestial body forms a body of water from collected solar moisture. To explain this process, first a deliquescent substance (e.g., magnesium chloride, $MgCl_2$) collects solar moisture and forms a pool of water on the surface. Although substances that can bind water that are not deliquescent can collect water, an ability to form a pool of water is necessary so that fluidic communication can be established with a salt deposit consisting of a water soluble salt (e.g., sodium chloride, NaCl). Accordingly, the pool of water leaches salt from the deposit by dissolution. Salt plays two roles in geopooling. As a deliquescent substance (e.g., $MgCl_2$), salt initiates the collection of solar moisture. As an abundant and highly soluble substance (e.g., NaCl), salt dissolves into the water and lowers the vapor pressure. This is why the sea has salt in it. For if it was not for having salt, the Earth would not be able to retain its water.

Once geopooling is initiated, the water content of the celestial body will increase until hydrostasis is achieved. Over geologic time, the water content will fluctuate based on equilibrium considerations, particularly variations in solar wetness. With respect to variations in solar wetness, the Earth orbits in a tropical region of space. The tropical solar wetness enables the Earth to constantly maintain a large body of water, unlike Mars, which periodically "dries out" in a semitropical orbit.

The invention may be appreciated as a discovery of the principles of nature governing the Earth's hydrostasis, as described above, combined with an inventive application of this discovery to the watering of the Moon, as described below.

The Moon orbits in substantially the same tropical region of solar wetness as the Earth. But the Moon is unable to initiate geopooling on its own due to salt deficiencies. It is this problem, more so than a difference in gravity, that explains why the Moon remains substantially dry, in contrast to the Earth. The invention solves this "dryness" problem by means of depositing a deliquescent substance having predetermined deliquescent properties on a surface of the Moon to collect ambient moisture from outer space. An exemplary deliquescent substance is magnesium chloride ($MgCl_2$). The collected water can then be desalinated or used in saline form.

2. Preferred Embodiment

Substances that readily absorb ambient water moisture from a surrounding environment are called hygroscopic, also known as drying agents or desiccants. A deliquescent substance is one that not only absorbs water from the surroundings (i.e., is hygroscopic) but also dissolves into the absorbed water to form a pool.

Some drying agents work to remove water by hydration and others work by chemical conversion. Some drying agents are not only hygroscopic but are also deliquescent. A large number of drying agents are known to chemists that are able to remove ambient water in a high vacuum environment. A large number of deliquescent substances are also known to chemists. The invention is not limited to a particular deliquescent substance, hygroscopic substance, drying agent, or desiccant. Candidate substances may be selected for various chemical and physical properties, such as binding affinity for water, usefulness in high vacuum, saltwater vapor pressure, solubility in water, light weight (for transport), non-toxicity, and ease of desalination.

For the purposes of the preferred embodiment, magnesium chloride ($MgCl_2$) is a preferred deliquescent substance. Calcium chloride ($CaCl_2$), lithium chloride (LiCl), and magnesium perchlorate $Mg(ClO_4)_2$ are notable alternatives, among many others. Although these substances exhibit their deliquescent properties in hydrated forms, anhydrous forms also bind the water of hydration.

Substances such as magnesium chloride, calcium chloride, and lithium chloride, that give up water reversibly, are preferable from the perspective of ease of regeneration (e.g., by reverse osmosis) compared to substances such as phosphorous pentoxide ($P_2O_5$) or barium oxide (BaO), that undergo chemical transformation when binding water; either type may be advantageously employed to collect some amount of water. Hygroscopic substances that are insoluble or poorly soluble in water, e.g., calcium sulfate ($CaSO_4$), are also notable.

According to the invention, a mixture may be made of any combination of a hygroscopic substance, deliquescent substance, and water soluble salt. Mixtures of highly soluble salts (e.g., NaCl) and deliquescent substances are preferred.

A table compiled by John H. Yoe lists "Drying agents depending upon chemical action (absorption) for their efficiency"; he also lists "Drying agents depending upon physical action (adsorption) for their efficiency"; he also notes that "the efficiency of some drying agents . . . depends upon both adsorption and absorption." (Yoe, J. H. "Efficiency of Drying Agents." Handbook of Chemistry and Physics. 72nd ed. Boca Raton, Fla.: CRC Press, 1991. p. 15-22.)

Figure 1:
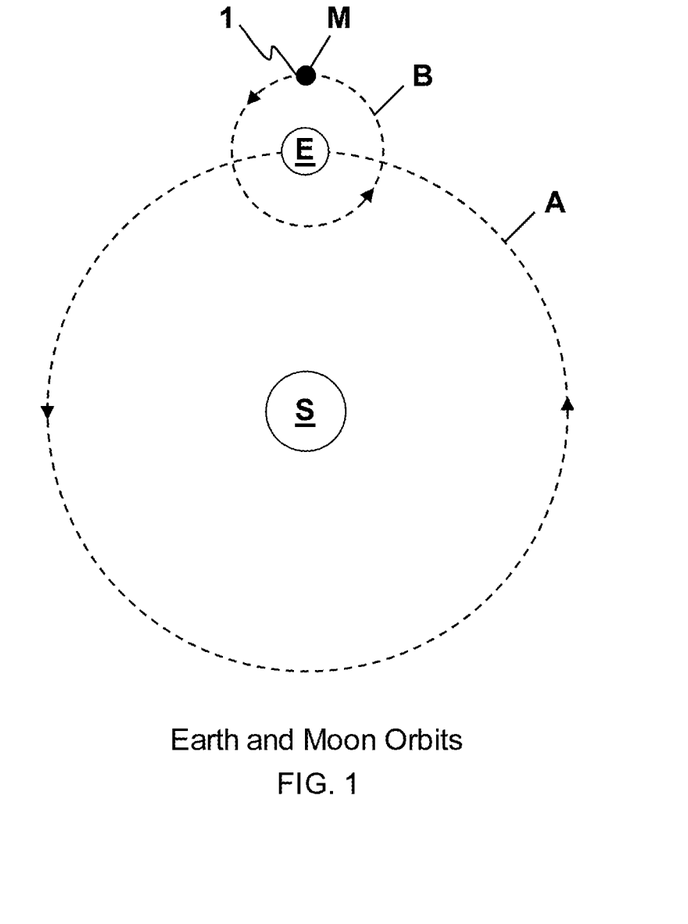
FIG. 1 is a diagram of Earth and Moon orbits.

FIG. 1 shows the Earth E in orbit A around the Sun S, and the Moon M in orbit B around the Earth E. Referring to FIG. 1, a preferred lunar site for depositing the magnesium chloride on the surface of the Moon is found on a surface of the Moon facing the Moon's trajectory, called the Moon's trajectory face 1. Although other surfaces of the Moon may be advantageously selected, a particular advantage of depositing the preferred deliquescent substance on the Moon's trajectory face 1 is that this surface faces forward in the direction of the Moon's course in orbit as the Moon encounters solar moisture from outer space (as the Moon M travels its orbital path B). In other words, the trajectory face serves as the palm side of a catcher's mitt formed by the Moon as it sweeps out a toroidal volume along its orbital path. In effect, depositing the preferred deliquescent substance on the surface of the Moon enables the encountered solar moisture to stick to the glove, meaning, to the surface of the Moon.

Figure 2A:
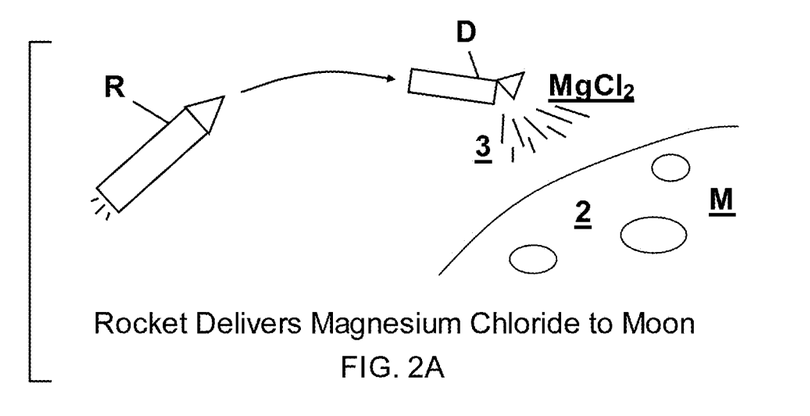
FIGS. 2A-C are perspective views of collecting water on the Moon according to the invention.

Referring to FIG. 2A, a preferred means of depositing the preferred deliquescent substance $MgCl_2$ on a preselected surface 2 of the Moon M is by rocket R. Delivery of the preferred deliquescent substance $MgCl_2$ to the surface 2 of the Moon M by rocket R is completed by any means of distributing the preferred deliquescent substance $MgCl_2$ on the preselected surface 2. Referring to FIG. 2A, an exemplary means of distribution is by detonating the rocket R over the surface 2 of the Moon M, so that the detonated rocket D emits a shower 3 of the preferred deliquescent substance $MgCl_2$ onto the preselected surface 2 of the Moon M. Other means include rocket impact, robotic distribution, and manual distribution by astronauts after landing on the Moon M.

Figure 2B:
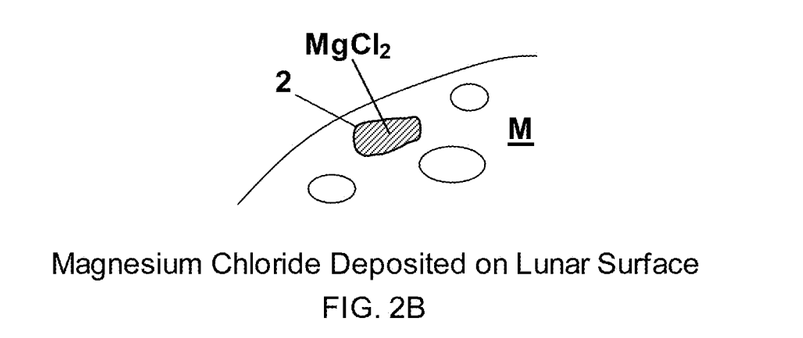
Figure 2C:
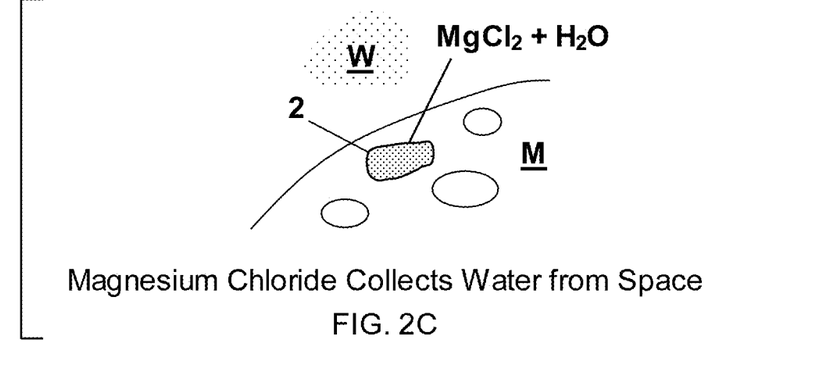

Referring to FIG. 2B, the preferred deliquescent substance $MgCl_2$ is shown distributed on the preselected surface 2 of the Moon M. Referring to FIG. 2C, according to the invention's theory of operation as described above, the preferred deliquescent substance $MgCl_2$ waters the Moon M by collecting solar moisture W from outer space and forming a pool of saltwater $MgCl_2+H_2O$ on the surface 2 of the Moon M.

3. Geopooling on the Moon

In theory, an ocean of water on the Moon could support an Earth-like atmosphere and temperature on the Moon by retaining dissolved gasses. It would be impractical, however, to transport an ocean's worth of salt to the Moon in order to collect and retain a lunar ocean.

Though presenting an alternative to transport, mining a preferred deliquescent substance on the Moon or forming it chemically from lunar matter would not be practical on an oceanic scale.

Figure 3A:
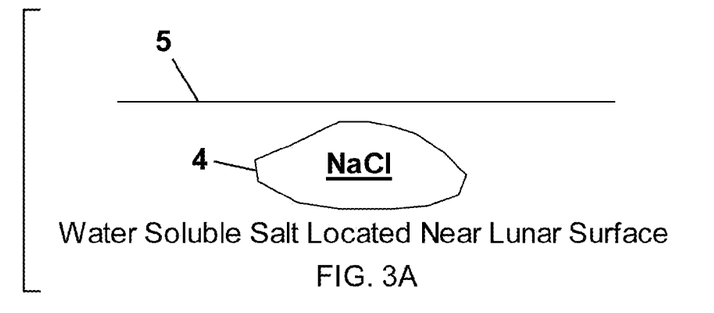
FIGS. 3A-D are side cross-sectional views showing a process of geopooling taking place on the Moon according to the invention.
Figure 3B:
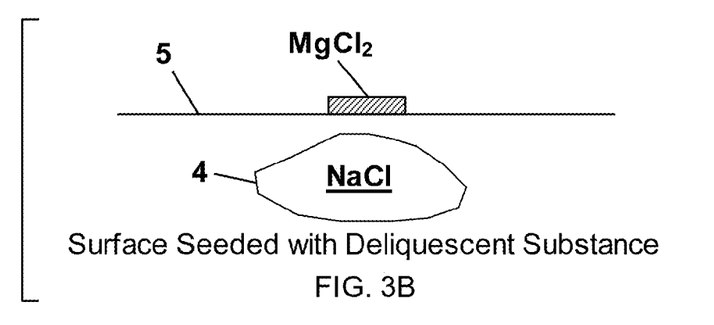
Figure 3C:
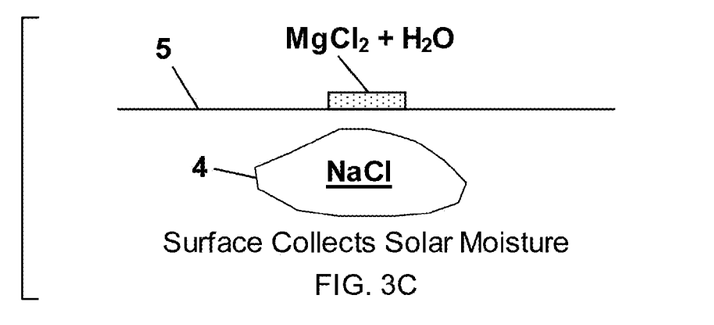
Figure 3D:
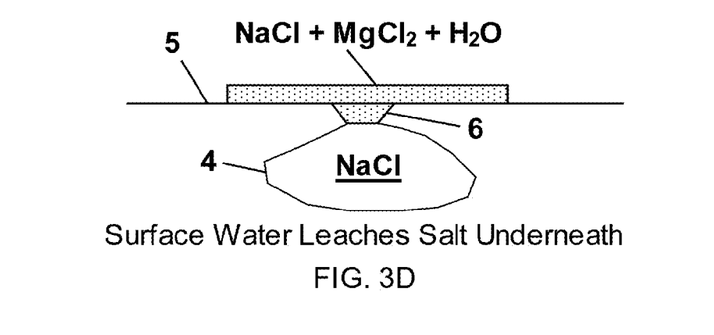

To overcome this limitation in ocean formation, the principle of geopooling may be employed advantageously. Referring to FIG. 3A, a lunar salt deposit 4 of a water soluble salt (e.g., NaCl) is located geologically near the surface 5. Referring to FIG. 3B, a deliquescent substance (e.g., $MgCl_2$) is deposited on the surface 5 above the lunar salt deposit 4. Referring to FIG. 3C, the deliquescent substance collects solar moisture from outer space, forming a small pool of saltwater (e.g., $MgCl_2+H_2O$) on the surface 5. Referring to FIG. 3D, fluidic communication 6 is established between the pool of saltwater on the surface 5 and the lunar salt deposit 4 underneath. Fluidic communication 6 can be established by means of digging, drilling, blasting, pumping, or by seepage of surface water. As a consequence of fluidic communication 6, a larger pool of water ("ocean") (e.g., $NaCl+MgCl_2+H_2O$) is formed as fluid on the surface 5 leaches salt from the lunar salt deposit 4 underneath. The growing pool will continue to collect more and more ambient water from outer space until hydrostasis is achieved.

4. Other Considerations

In order for a deliquescent salt to optimally collect solar moisture from outer space on a surface of the Moon, it is preferable that the surface temperature should not exceed the boiling point of the saltwater. For geopooling, it is also preferable that the pool temperature should not fall below the freezing point. For this reason, it is preferable to locate a lunar surface such that temperatures will fall within predetermined ranges during the collection of solar moisture. Another alternative is to employ a shelter, insulation, heat sink, or heat source to guard against extremes of temperature.

A saltwater liquid of low vapor pressure is desirable for optimal collection of ambient solar moisture. It is therefore preferable to maintain a high concentration of salt to maintain a low vapor pressure. In other words, as a pool of water is collected, keeping the pool salty helps to maintain a low vapor pressure. According to Raoult's law, the vapor pressure of water decreases as the number of salt ion molecules dissolved in the water increases; the freezing point of the water also decreases, and the boiling point increases. Salt is excluded when water freezes or boils.

According to the invention, a deliquescent substance functions to initiate water collection, with formation of a pool of water. However, once a pool or atmosphere is formed, these too will collect solar moisture as long as outer space is wet enough. For this reason, depositing saltwater on the lunar surface will also aid in moisture collection. But saltwater having a high concentration of a deliquescent substance may advantageously have a lower vapor pressure than observed for other solutes and than predicted for an ideal solution by Raoult's law; a low vapor pressure is advantageous in initially collecting a net amount of solar moisture from outer space, when the atmospheric vapor pressure is lowest. In view of the invention, it will be a matter of ordinary skill for one skilled in the art of physical chemistry to select candidate substances based on their saltwater vapor pressure at lunar temperatures at given concentrations.

The efficiency of candidate substances can be tested by one of ordinary skill in view of the invention by measuring the efficiency of water collection, including with the aid of monitoring sensors placed on the Moon. Sensors on the Moon can also be employed to detect locations on the lunar surface encountering a greater flux of solar moisture. It will be obvious to one of ordinary skill to try various mixtures and preparations of substances for their water-collecting ability in view of the invention. For example, it is found that calcium chloride has a greater efficiency as a drying agent when prepared in fused form compared to in granular form. (See Yoe, J. H. Ibid.) Therefore, it will be obvious to one of ordinary skill to try various preparations and to test them for their efficiency.

As water is collected, stirring, agitation, and convection are advantageous to maintain a high surface concentration of salt to promote further collection.

Desalinated water can be stored in a reservoir and the deliquescent substance reused to collect more water from outer space. In this manner a small quantity of deliquescent substance transported to the Moon can be used over and over again to collect a relatively large amount of water.

Moisture sensors, whether placed on celestial bodies or in orbit, can be used to collect meteorological data concerning solar moisture.

5. Comparison to NASA's Theory

NASA teaches that billions of years ago water-bearing comets and asteroids pummeled the Earth and Moon, leaving an abundance of water, but that the Moon did not retain water as the Earth did, due to a weaker gravity. Today, some scientists believe remnants of water delivered to the Moon in this fashion may remain in shadowy recesses at the poles of the Moon, where it is freezing cold and the Sun's light does not shine.

In contrast, the theory of the invention is that the Earth's water is maintained in relation to an ambient process of hydrostasis with respect to solar moisture in the Earth's orbital path. Importantly, unlike the theory adopted by NASA, this theory relies on principles of equilibrium to explain the Earth's water balance. Similarly, with regard to the speculation that ice may be present in polar recesses on the Moon, the present teaching is more likely to attribute the possibility of such ice to a solid state condensation of solar moisture, based on equilibrium principles, rather than to delivery by comets.

6. Other Embodiments

The invention is titled a method of collecting water on the Moon to emphasize the preferred embodiment. But a more general title for the invention is a method of wetting a space bound body with ambient moisture from outer space. Exemplary bodies include celestial bodies, spacecraft, and artificial satellites. Importantly, the invention is not limited to a use of deliquescent substances to effectuate a wetting of the body.

For example, one skilled in the art of nanotechnology will appreciate that surfaces of a body may be coated with a nanocoating or nanostructures to collect solar moisture encountered in the body's path when traveling through space. The surfaces are preferably oriented in the direction of travel. Additionally, one skilled in the art of microfluidics will appreciate that microfluidics can be integrated with nanotechnology to channel amounts of collected moisture to reservoirs.

7. Note on Related Art

According to Wikipedia: "In 1960 Robert W. Bussard proposed the Bussard ramjet, in which a huge scoop would collect the diffuse hydrogen in interstellar space, "burn" it using a proton-proton fusion reaction, and expel it out of the back." The Bussard ramjet is related in that it teaches a catcher's mitt type collection of an ambient molecule from outer space, in this case hydrogen. Known as a "ram scoop", the mitt in this case is formed by an electromagnetic field.

According to Lunarpedia: "At the lunar poles there are believed to be regions which never receive direct sunlight. If they don't receive significant warming from higher elevation surfaces that are in direct sunlight, they would be equilibrated only with the thermal background radiation of deep space at 2-3 K (−270 degrees C.), and would likely form cold traps holding volatile materials."

8. New Developments

New reports since the filing of the provisional application are consistent with the theory of the invention. See Pieters et al., "Character and Spatial Distribution of OH/H2O on the Surface of the Moon seen by M3 on Chandrayaan-1," Science, 23 Oct. 2009: Vol. 326, No. 5952, pp. 568-572 (first announced 24 Sep. 2009). The invention is not obvious in view of such reports because they only provide retrospective insight into the surprising ingenuity of the invention. See also Ser. No. 61/085,420.

Figure 4:
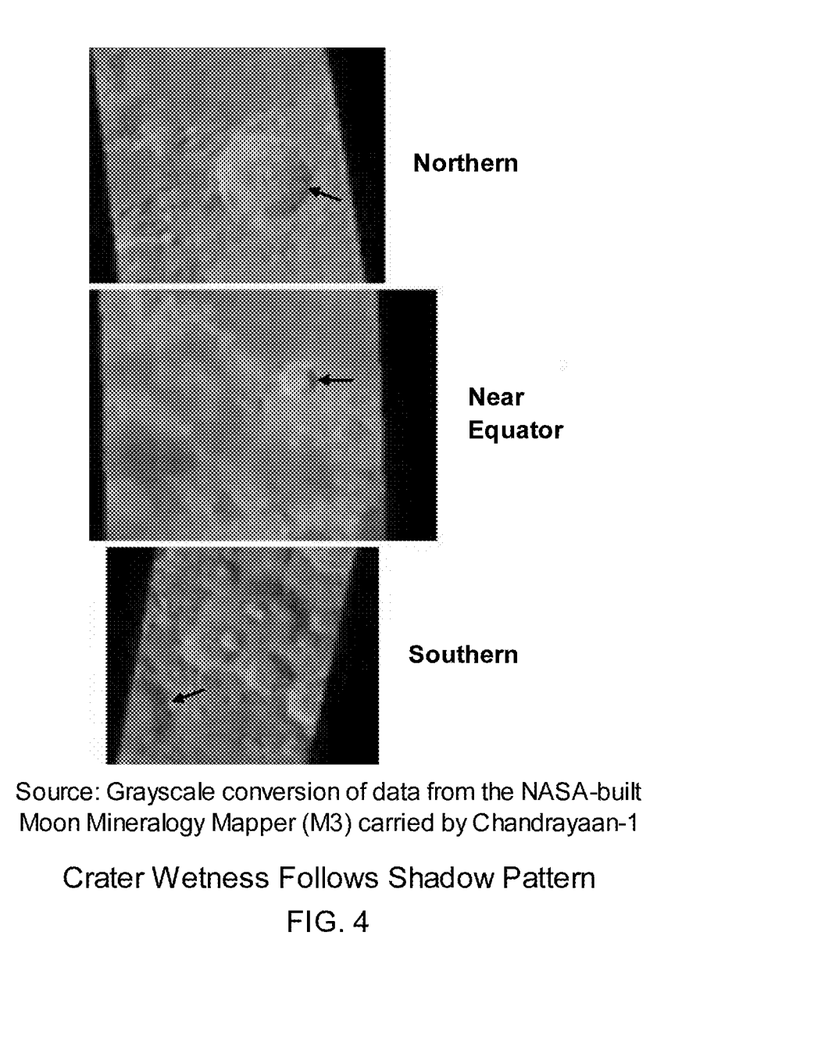
FIG. 4 is a series of satellite images showing a crescent-shaped pattern of surface water detected in craters on the sunlit surface of the Moon.

India's Chandrayaan-1 space probe brought back evidence confirming that the entire surface of the Moon is orders of magnitude wetter than indicated by samples presented by Apollo and Luna missions. FIG. 4 shows a grayscale conversion of data from the probe's NASA-built Moon Mineralogy Mapper (M3) indicating surface water on the Moon. Shown are images taken along longitude 15 degrees east. Assuming the Sun is rising in the east, arrows indicate a direction of sunlight shining upon selected craters. Crescent-shaped dark areas within the selected craters indicate a greater content of surface water than light shaded areas. Importantly, note that respective orientations of the crescent-shaped dark areas are consistent with shadowing in sunlight by crater walls as the Sun rises in the east. Namely, a southeast portion is shaded in the interior of a northern crater; an eastern portion is shaded in an equatorial crater; and, a northeastern portion is shaded in a southern crater.

Consistent with the theory of the present invention, an interpretation of this data is that sunlight from the Sun rising in the east has caused water trapped in the soil to evaporate, except in shadowed regions cast by crater walls. According to the theory of the present invention, the Moon is constantly bombarded by solar moisture in its path. This allows the Moon to constantly collect solar moisture at its surface. But the Moon does not retain the moisture on an oceanic scale. Instead, the water evaporates each day where the Sun shines its heat. Referring to the selected craters shown in FIG. 4, a contrast between dark and light shaded areas indicates a substantial difference in surface water content. Importantly, this would imply that the Moon collects an amount of solar moisture equal to at least the indicated difference in the course of each lunar day.

Recent data also confirms that water ice is present at the polar regions of the Moon. It has been suggested that a mining of polar ice could supply water to non-polar stations on the Moon. A disadvantage of this method is that it involves the expense of transport back and forth. Another disadvantage is that the heat of the Sun cannot be used in polar regions to aid in an extraction of water from the lunar soil.

In contrast, a tremendous advantage of the present invention is that it enables solar moisture to be collected in situ on the surface of the Moon using a collecting means. An exemplary collecting means comprises a deliquescent substance or other drying agent. Though not as good at collecting moisture as some drying agents, lunar regolith serves as an abundant and inexpensive drying agent compared to deliquescent or hygroscopic salts brought from Earth. Water collected by the deliquescent substance or other drying agent in a lunar night or low sun can be diurnally released as water vapor for containment using solar heating in a lunar day. The released vapor can be trapped or housed by a nominal containment means (e.g., tubes) to trap or pressurize the vapor. Pressurized vapor can be used for steam power to generate electricity by means of a steam turbine. The steam can be vented into space or recaptured. The steam can be cooled by transfer to a cooling means to produce cooled vapor or liquid water. The cooling means can be provided by lunar soil at a predetermined depth or in shadows.

The invention provides a method of obtaining water on the Moon, comprising collecting solar moisture in situ. In an exemplary embodiment, the step of collecting includes means of a deliquescent substance having predetermined deliquescent properties to capture the solar moisture in situ.

What is claimed is:

1. A method of collecting water on the Moon, comprising:
   (a) depositing a drying agent having predetermined drying agent properties on a preselected lunar surface, the depositing being performed manually, robotically, or via delivery by space vehicle;
   (b) capturing by means of the drying agent a flux of ambient water moisture being encountered at the surface from above; and,
   (c) exploiting the drying agent as a resource of the water captured in step (b).

2. The method of claim 1 wherein the drying agent is selected from the group consisting of calcium chloride ($CaCl_2$), concentrated saltwater, lithium chloride (LiCl), magnesium chloride ($MgCl_2$), magnesium perchlorate ($Mg(ClO_4)_2$), and phosphorous pentoxide ($P_2O_5$), potassium chloride (KCl), a salt, a salt mixture, salt nanostructures, and sodium chloride (NaCl).

3. The method of claim 1 wherein the preselected lunar surface is located in a region selected from the group consisting of a sunlit region, a non-polar region, a region near the equator, a sunlit region facing forward with respect to the Moon's course in orbit around the Earth, and a non-polar region facing forward with respect to the Moon's course in orbit around the Earth.

4. A method of collecting water on the Moon, comprising:
   (a) seeding a preselected lunar surface with a drying agent having an ability to comprise a liquid;
   (b) absorbing ambient water moisture from outer space by means of the drying agent to comprise a pool of liquid containing the absorbed water on the lunar surface;
   (c) establishing fluidic communication between the pool containing water and a lunar ground; and,
   (d) leaching salt ions from the ground by means of fluidic communication with the pool containing water;
   whereby salt from the ground helps to maintain a saltiness and low vapor pressure of the pool to sustain a continued growth of the pool.

5. The method of claim 4 wherein the drying agent is selected from the group consisting of calcium chloride ($CaCl_2$), concentrated saltwater, lithium chloride (LiCl), magnesium chloride ($MgCl_2$), magnesium perchlorate ($Mg(ClO_4)_2$), potassium chloride (KCl), a salt, a salt mixture, salt nanostructures, and sodium chloride (NaCl).

6. A method of obtaining water on the Moon, comprising: on a surface disposed with a drying capacity to collect ambient water moisture from the void of outer space,
   (a) collecting the ambient water moisture;
   (b) harvesting the collected water;
   (c) restoring the drying capacity for repetitious collection; and,
   (d) on the restored surface, repeating at least the collecting and harvesting;
   whereby water is obtained on the Moon as a renewable resource.

7. The method of claim 6, wherein said surface is disposed with said drying capacity by means of one or more drying agents having predetermined drying agent properties to collect said ambient water moisture.

8. The method of claim 7, wherein said drying agent is selected from the group consisting of a hygroscopic substance, hygroscopic salt, deliquescent substance, deliquescent salt, desiccant, saltwater, nanocoating, nanostructure, and regolith.

9. The method of claim 8, wherein said surface faces a flux of said ambient water moisture being encountered from said void of outer space.

10. The method of claim 9, wherein said ambient water moisture is collected at said surface by said drying agent in a lunar night or low sun and is diurnally harvested as vapor by means of solar heating in a lunar day and which heating restores said drying capacity.

11. The method of claim 10, wherein said harvesting includes trapping said vapor by a containment means as trapped vapor.

12. The method of claim 10, wherein said harvesting includes housing said vapor by a containment means as pressurized vapor.

13. The method of claim 12, wherein said pressurized vapor is employed as vapor for steam power.

14. The method of claim 13, wherein said vapor for steam power generates electricity by means of a steam turbine.

15. The method of claim 13, wherein said vapor for steam power is vented into said void of outer space.

16. The method of claim 13, wherein said vapor for steam power is recaptured.

17. The method of claim 13, wherein said vapor for steam power is transferred to a cooling means to produce cooled vapor.

18. The method of claim 17, wherein said cooled vapor is condensed as liquid water.

19. The method of claim 17, wherein said cooling means is provided by lunar soil or regolith at a predetermined depth.

20. The method of claim 17, wherein said cooling means is provided by lunar soil or regolith in a lunar shadow.

* * * * *